(12) United States Patent
Lui et al.

(10) Patent No.: US 6,256,009 B1
(45) Date of Patent: Jul. 3, 2001

(54) METHOD FOR AUTOMATICALLY AND INTELLIGENTLY SCROLLING HANDWRITTEN INPUT

(75) Inventors: Charlton E. Lui, Redmond; Dan W. Altman, Kirkland; David B. Wecker, Bothell, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/256,525

(22) Filed: Feb. 24, 1999

(51) Int. Cl.⁷ .................................................. G09G 5/34
(52) U.S. Cl. ..................... 345/123; 345/173; 345/341; 178/18.03
(58) Field of Search ..................................... 345/124, 125, 345/123, 341, 973, 173–183; 178/18.01–18.11, 19.01–19.07

(56) References Cited

U.S. PATENT DOCUMENTS

| | | | |
|---|---|---|---|
| Re. 34,476 | 12/1993 | Norwood | 382/186 |
| 5,058,046 | 10/1991 | Lapeyre | 708/146 |
| 5,128,672 | 7/1992 | Kaehler | 341/23 |
| 5,276,794 | 1/1994 | Lamb, Jr. | 707/507 |
| 5,517,578 | 5/1996 | Altman et al. | |
| 5,528,743 | 6/1996 | Tou et al. | 707/541 |
| 5,574,482 | 11/1996 | Niemeier | 345/173 |
| 5,644,339 | 7/1997 | Mori et al. | 345/173 |
| 5,748,512 | 5/1998 | Vargas | 345/173 |
| 5,777,605 | 7/1998 | Yoshinobu et al. | 345/173 |
| 5,818,425 | 10/1998 | Want et al. | 345/173 |
| 5,838,302 | 11/1998 | Kuriyama et al. | 345/173 |
| 5,914,707 | 6/1999 | Kono | 345/173 |
| 5,936,614 | 8/1999 | An et al. | 345/173 |
| 6,008,799 | 12/1999 | Van Kleeck | 345/173 |
| 6,031,525 | 2/2000 | Perlin | 345/173 |
| 6,094,197 | 7/2000 | Buxton et al. | 345/358 |

FOREIGN PATENT DOCUMENTS

| | | |
|---|---|---|
| 0 464 712 | 1/1992 | (EP) . |
| 01-191226 | * 8/1989 | (JP) . |
| 08-22385 | * 11/1996 | (JP) . |
| WO 92/09944 | 6/1992 | (WO) . |

OTHER PUBLICATIONS

Anonymous, "Function–Independent Approach to Driving Soft Keyboards," *IBM Technical Disclosure Bulletin*, vol. 33, No. 4, pp. 159–161 (Sep. 1990).

Anonymous, "Soft Adaptive Follow–Finger Keyboard for Touch–Screen Pads," *IBM Technical Disclosure Bulletin*, vol. 36, No. 11, pp. 5–7 (Nov. 1993).

Kano, Nadine, *Developing International Software for Windows 95 and Windows NT*, Chapter 7, Appendix N and Appendix O, Microsoft Press, pp. 202–229, 553–556, 557–563 (1995).

\* cited by examiner

*Primary Examiner*—Lun-Yi Lao
(74) *Attorney, Agent, or Firm*—Michalik & Wylie, PLL

(57) ABSTRACT

A method for automatically and intelligently scrolling handwritten ink entered into a computer device. The method detects when the user is on the last available line for writing, and starts a timer on each pen-up event or resets the timer on a pen-down event. An automatic scroll is performed after the writing on the last line has halted for more than a threshold amount of time. The threshold time may be variable based on criteria, such as the x-coordinate of the last writing, the writing speed of the user, the last character that was written, and the current zoom percentage of the display. The zoom percentage may also be used to determine the number of lines to scroll. New ink written after the automatic scrolling operation may be moved up to the scrolled ink, if the method determines that the user intended to write the new ink directly after the scrolled ink.

42 Claims, 13 Drawing Sheets

METHOD FOR AUTOMATICALLY AND INTELLIGENTLY SCROLLING HANDWRITTEN INPUT

TECHNICAL FIELD

The invention relates generally to computer systems, and more particularly to the input of data into a computer system.

BACKGROUND OF THE INVENTION

Small, mobile computing devices, including hand-held and palm-size computers and the like, are becoming important and popular user tools. In general, they are becoming small enough to be extremely convenient while consuming less and less battery power, and at the same time becoming capable of running more powerful applications.

Although such devices continue to shrink in size, size limitations are being reached as a result of human limitations. For example, a full character keyboard that enables user data input cannot be so small that human fingers cannot depress the individual keys thereon. As a result, such devices (e.g., palm-size computers) may eliminate the full size physical keyboard and provide a representation of a keyboard on a touch-sensitive display. To this end, the user enters characters by touching the screen with a stylus at locations corresponding to the displayed keys.

Alternatively, devices have been developed that allow the user to enter data written by hand directly on the screen. These devices receive pen movements as digital ink, and display the ink on the screen as it is input. The application may store the digitized ink as is, or the application may interpret some of the ink, e.g., it may attempt some form of character recognition, and then store the interpretation as ASCII text or the like.

Unlike conventional word processors that manually scroll upon receiving an enter key, or automatically scroll when the user has typed a character that will not fit on the currently displayed screen, when entering handwritten characters, there is no way to precisely know whether the user has finished writing on the last-displayed line or intends to add more to that line. For example, if the user is writing in the middle of the last line, it is not clear whether the user has ended one paragraph and wants to start a new paragraph, or whether the user is preparing to write additional characters on the same line. Similarly, it is not known when the user wants to keep writing in the same paragraph, but needs a new line to fit in the next word.

To avoid this problem, prior art inking mechanisms require the user to manually scroll the ink. However, manual scrolling is inconvenient and annoying to many users, slows down the input of information and tends to interrupt the user's thought processes as the user hunts for the scroll button.

SUMMARY OF THE INVENTION

Briefly, the present invention provides a method and system for automatically and intelligently scrolling handwritten input on a computer system. When the user reaches or passes a scroll point, typically the last displayed line for entering handwritten information, any pause by the user is timed. A pause is ordinarily defined by the user lifting the pen. The duration of the pause is compared against a threshold time, and once the threshold time is achieved, the system automatically scrolls for the user.

The threshold time may be variable, such as based on criteria including the last x-coordinate written before the pause, the amount that the screen is zoomed, the measured speed of the writer, or various combinations of these criteria. The amount to scroll may be similarly variable. Also, the automatic scroll may be effectively undone, such as by moving later-written ink up to eliminate any gap that likely resulted from the automatic scrolling operation, or by moving the scrolled ink back down, undoing the scroll.

Other advantages will become apparent from the following detailed description when taken in conjunction with the drawings, in which:

DETAILED DESCRIPTION OF THE PREFERRED EMBODIMENT

Exemplary Operating Environment

Figure 1:
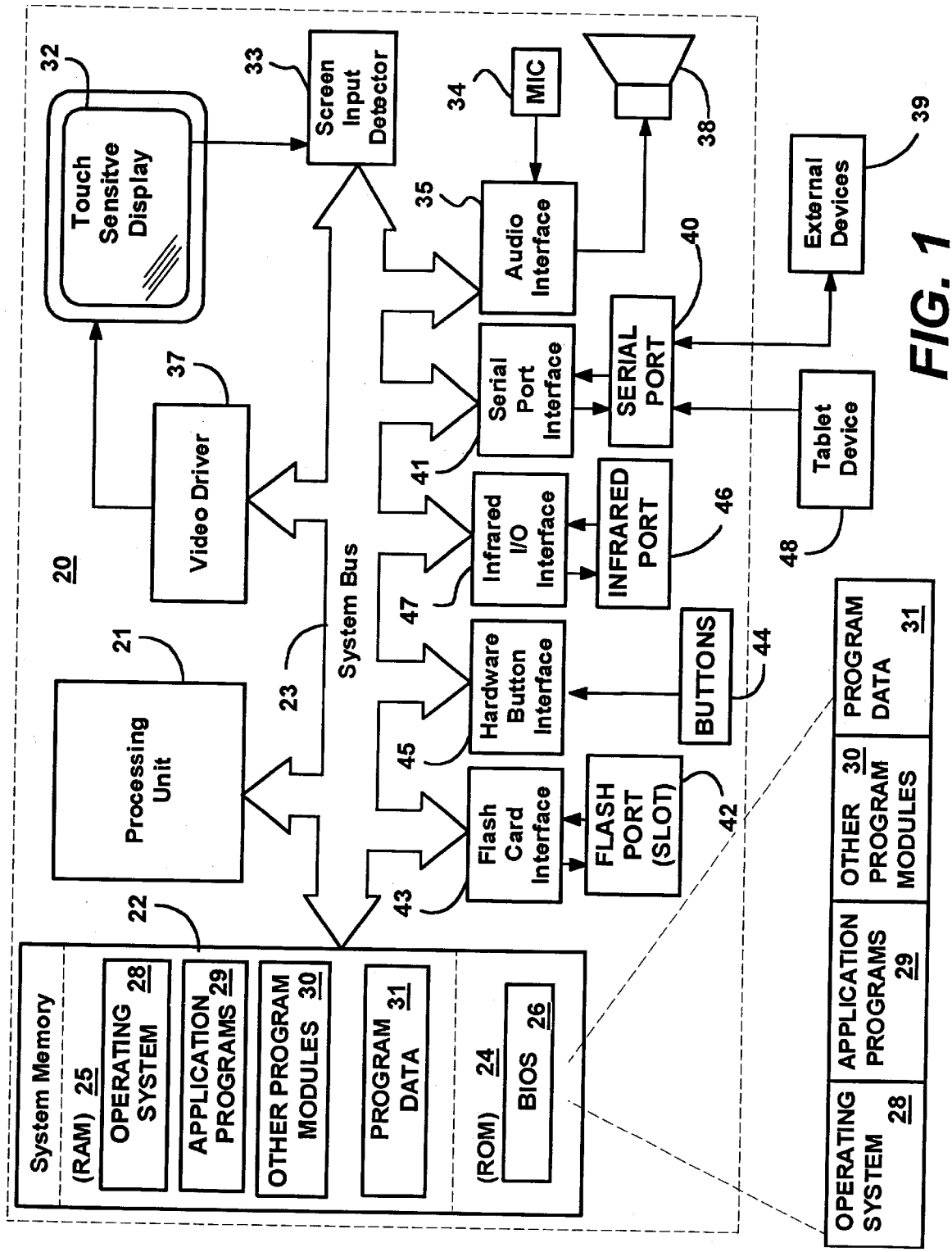
FIG. 1 is a block diagram representing a computer system into which the present invention may be incorporated.

FIG. 1 and the following discussion are intended to provide a brief, general description of a suitable computing environment in which the invention may be implemented. Although not required, the invention will be described in the general context of computer-executable instructions, such as program modules, being executed by a hand-held computing device such as a mobile device. Generally, program modules include routines, programs, objects, components, data structures and the like that perform particular tasks or implement particular abstract data types.

Moreover, those skilled in the art will appreciate that the invention may be practiced with other computer system configurations, including palm-sized, desktop or laptop personal computers, mobile devices such as pagers and telephones, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a hand-held personal computing device 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the hand-held computer 20, such as during start-up, is stored in the ROM 24.

Figure 2:
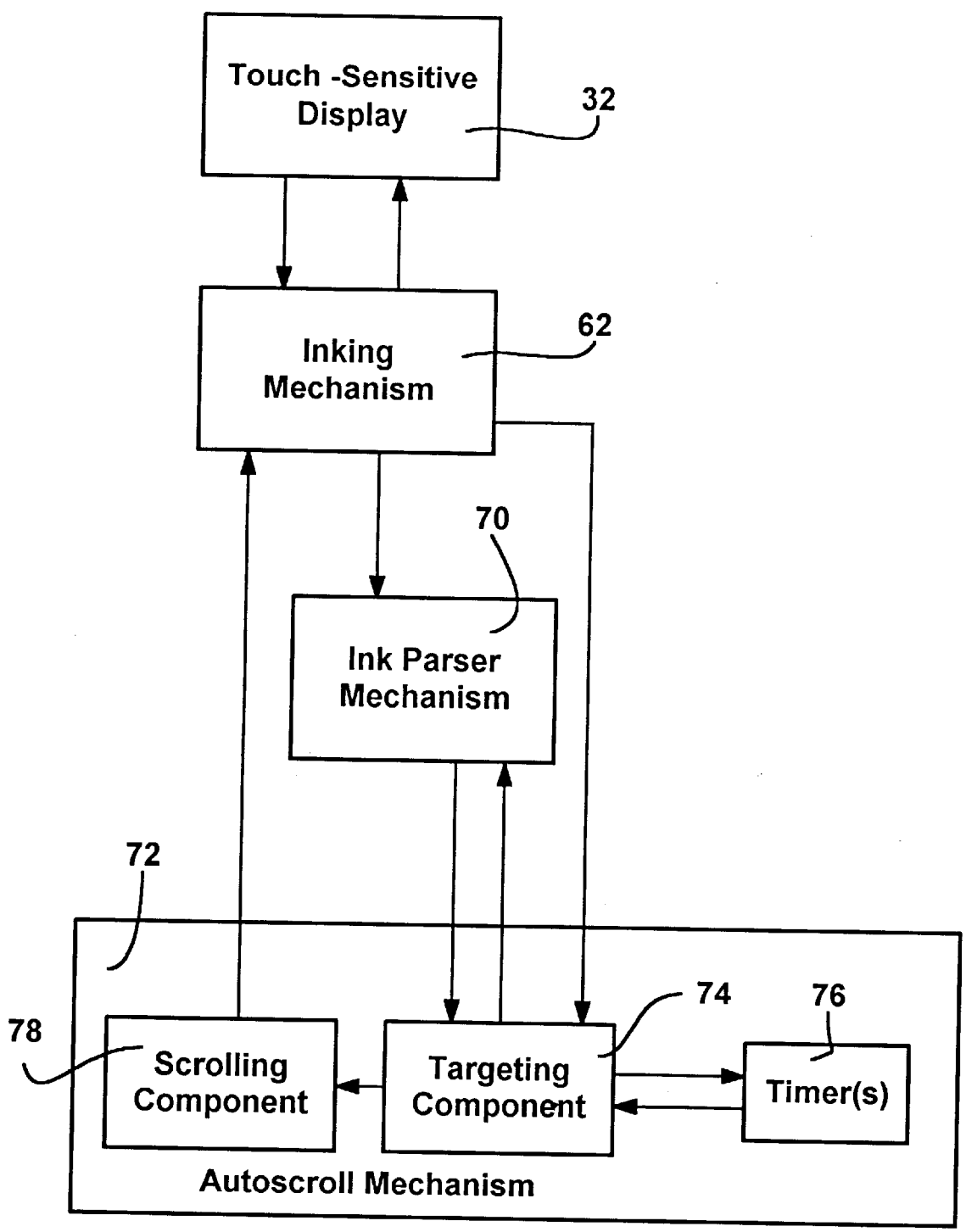
FIG. 2 is a block diagram representing an underlying system architecture into which the present invention may be incorporated.

A number of program modules are stored in the ROM 24 and/or RAM 25, including an operating system 28 (preferably Microsoft Corporation's Windows® CE operating system), one or more application programs 29, other program modules 30 and program data 31. A user may enter commands and information into the hand-held computer 20 through input devices such as a touch-sensitive display screen 32 with suitable input detection circuitry 33. Other input devices may include a microphone 34 connected through a suitable audio interface 35 and a physical (hardware) keyboard 36 (FIG. 2). The output circuitry of the touch-sensitive display 32 is also connected to the system bus 23 via video driving circuitry 37. In addition to the display 32, the device may include other peripheral output devices, such as at least one speaker 38 and printers (not shown).

Other external input or output devices 39 such as a joystick, game pad, satellite dish, scanner or the like may be connected to the processing unit 21 through an RS-232 or the like serial port 40 and serial port interface 41 that is coupled to the system bus 23, but may be connected by other interfaces, such as a parallel port, game port or universal serial bus (USB). The hand-held device 20 may further include or be capable of connecting to a flash card memory (not shown) through an appropriate connection port (e.g., slot) 42 and interface 43. A number of hardware buttons 44 such as switches, buttons (e.g., for switching application) and the like may be further provided to facilitate user operation of the device 20, and are also connected to the system via a suitable interface 45. An infrared port 46 and corresponding interface/driver 47 are provided to facilitate communication with other peripheral devices, including other computers, printers, and so on (not shown). It will be appreciated that the various components and connections shown are exemplary and other components and means of establishing communications links may be used. For example, instead of receiving user pen input via a touch-sensitive device 32, the input may be received by a tablet device 48 or the like, such as connected through the serial port 40.

AUTOMATIC SCROLLING

Turning to FIG. 2, there is shown a general architecture for handling the input of handwritten electronic ink. In FIG. 2, the various components shown may be built into the hardware of the device 20, part of the operating system 28, within one or more separate application programs 29, and/or in other program modules 30 (e.g., dynamic link libraries, COM objects, and so on). As can be readily appreciated, the various components may be split into further sub-components or combined, and each sub-component can reside in any of the hardware, operating system, application or other program modules.

Figure 3:
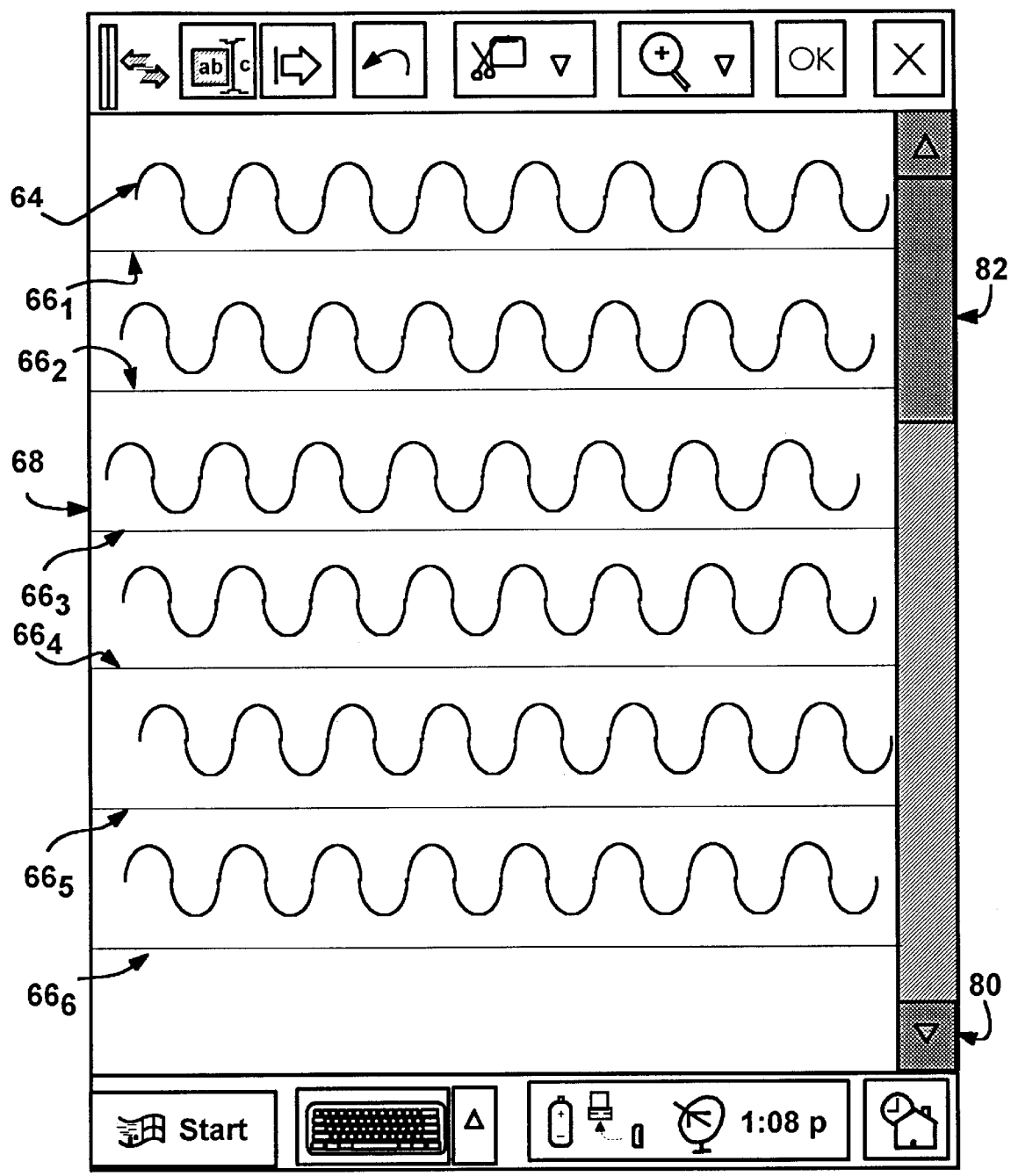
FIG. 3 represents a display on a touch-sensitive display screen on an exemplary computing device showing the receipt of written ink input.

While inking, the touch sensitive display 32 feeds input information into an inking mechanism 62. The inking mechanism 62 is a foreground thread, typically controlled by the operating system, that performs two primary functions, one of which is to capture the ink and send (BLIT) it to the screen for visual feedback to the user. As shown in FIG. 3, as the users enters ink (shown in FIG. 3 as wavy lines 64) between the horizontal lines $66_1$–$66_n$, it appears on the display screen 68. The other function of the inking mechanism 62 is to pass the ink as digital polylines to a background thread referred to herein as an ink parser mechanism 70. The ink parser mechanism 70 (typically in an application program along with an autoscroll mechanism 72) examines the ink and determines characters, words, paragraphs, drawings and bulleted outlines therefrom. Among other functions, the ink parser mechanism 70 tracks which lines (corresponding to the lines $66_1$–$66_n$) have been written. Note that in a preferred implementation, the number of lines is variable depending on a zoom percentage that may be selected by the user.

In accordance with one aspect of the present invention, the autoscroll mechanism 72 uses the line information to determine whether the user has reached a scroll point, a point at which automatic scrolling may be performed (provided that certain other criteria is met, as described below). At present, the scroll point is the last line that is displayed, but could, for example, be chosen to be the next-to-last line. Indeed, although presently fixed as the last line, the scroll point may be made user-selectable.

To obtain the line information, a targeting component 74 of the autoscroll mechanism 72 queries the ink parser mechanism 70. If the scroll point has been reached, the targeting component then determines if the user has paused writing. In a present implementation, this corresponds to a pen-up event detected by the inking mechanism 62, but may, for example, also be a pen-down condition that has not substantially moved for a relatively long period of time. When the user pauses, the targeting component starts a timer 76, such as by receiving and storing a time stamp, either by requesting a time stamp (e.g., from the operating system) or by receiving a time stamp in conjunction with the pen-up event. Other types of timers, such as hardware-based timers or a timer that fires event notifications may be alternatively used to establish the pause duration, as understood by those skilled in the art.

In accordance with one aspect of the present invention, the targeting component 74 uses the timer 76 to determine whether the duration of the pause is sufficient to start the automatic scrolling operation. As described in more detail below, if the user starts writing (a pen-down event occurs) before the pause reaches a threshold time, (e.g., one second), or manually scrolls the ink, the timer is essentially reset until the next pause, where the process begins again. In this manner, the automatic scrolling operation has intelligence that may be perceived by the user, in that automatic scrolling only takes place if the user has reached a scroll point, and only if the user has idled for a sufficient period of time.

If the user has reached a scroll point and the pen-up has achieved the threshold time, the targeting component calls a scrolling component 78 to scroll the ink, preferably by a percentage of the next page. As will be described below, the scroll amount thus varies based on the current zoom percentage, whereby the user gets a reasonable amount of new space to continue writing. As also described below, the autoscroll mechanism 72 may handle new ink added by the user after the automatic scrolling operation took place, when it is likely that the user did not yet want the page to scroll. For example, the new ink may be moved up to follow the scrolled ink, thus eliminating any unwanted vertical gap between words, or the last automatic scrolling operation may be undone.

Figure 10:
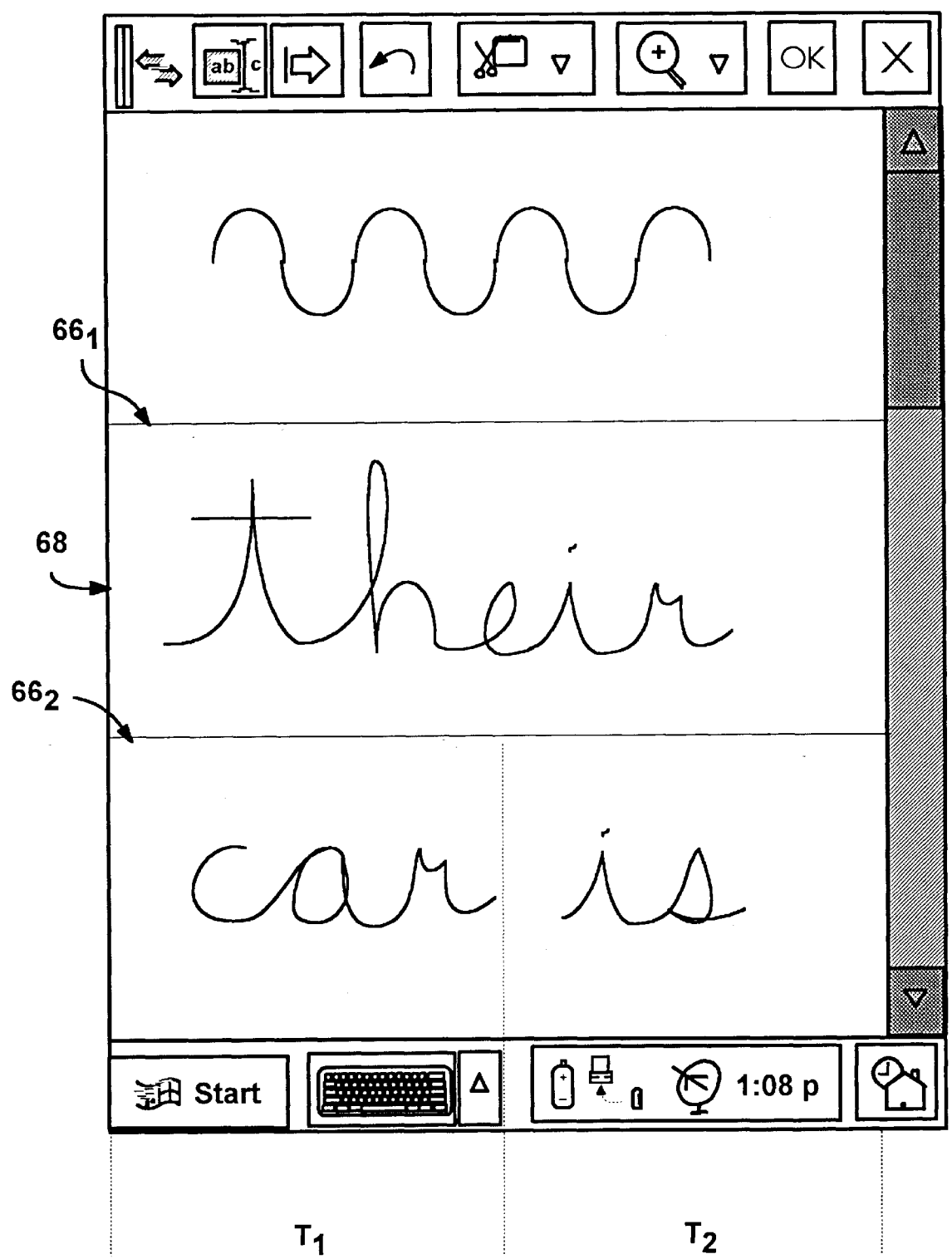
FIG. 10 represents a display on a touch-sensitive display screen on an exemplary computing device showing the use of the horizontal position of the ink to establish a threshold time while in the zoomed-in state of FIG. 8.
Figure 11:
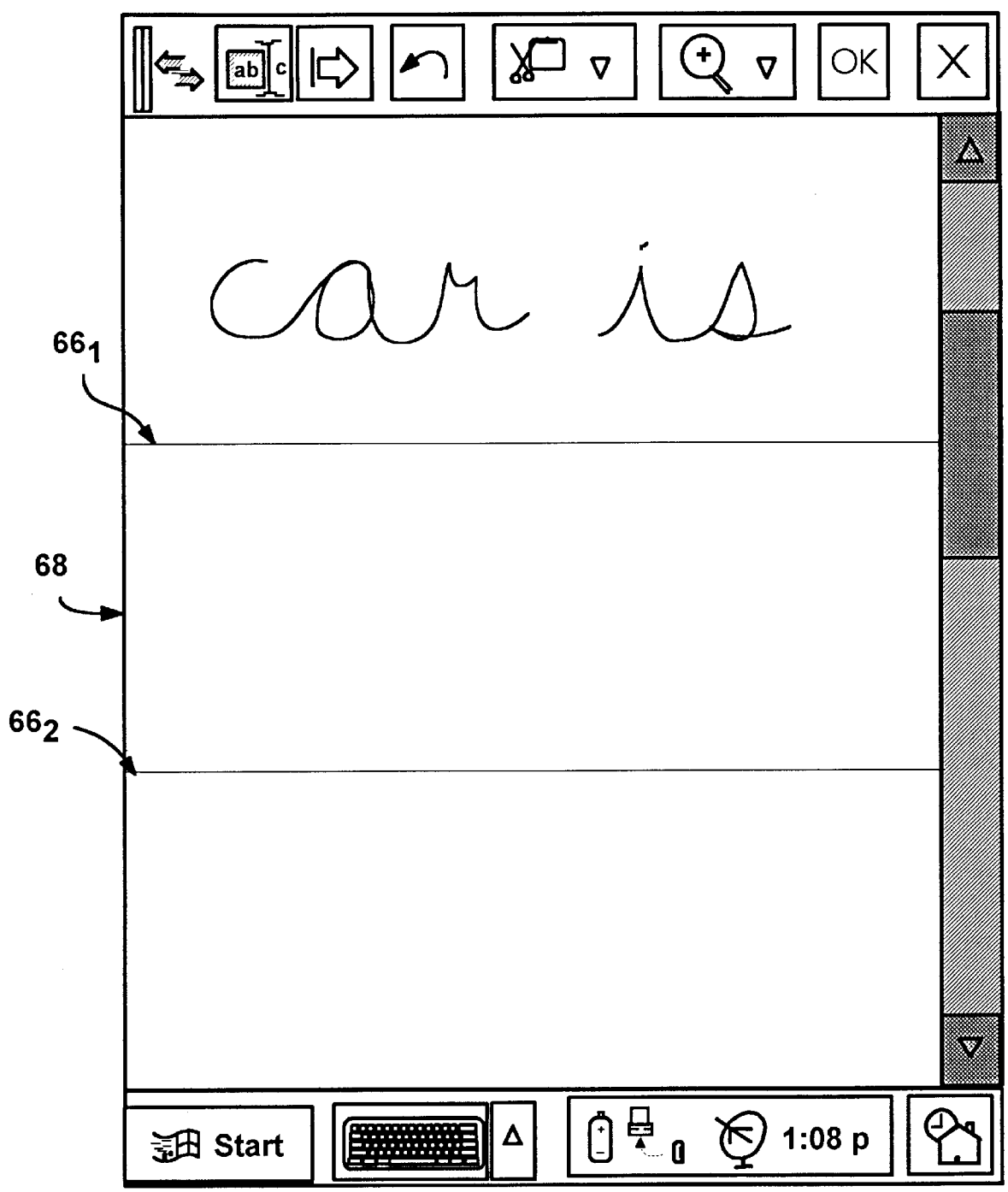
FIG. 11 represents a display on a touch-sensitive display screen on an exemplary computing device showing the written ink of FIG. 9 having been automatically scrolled an amount based on the zoom percentage in accordance with an aspect of the present invention.
Figure 12:
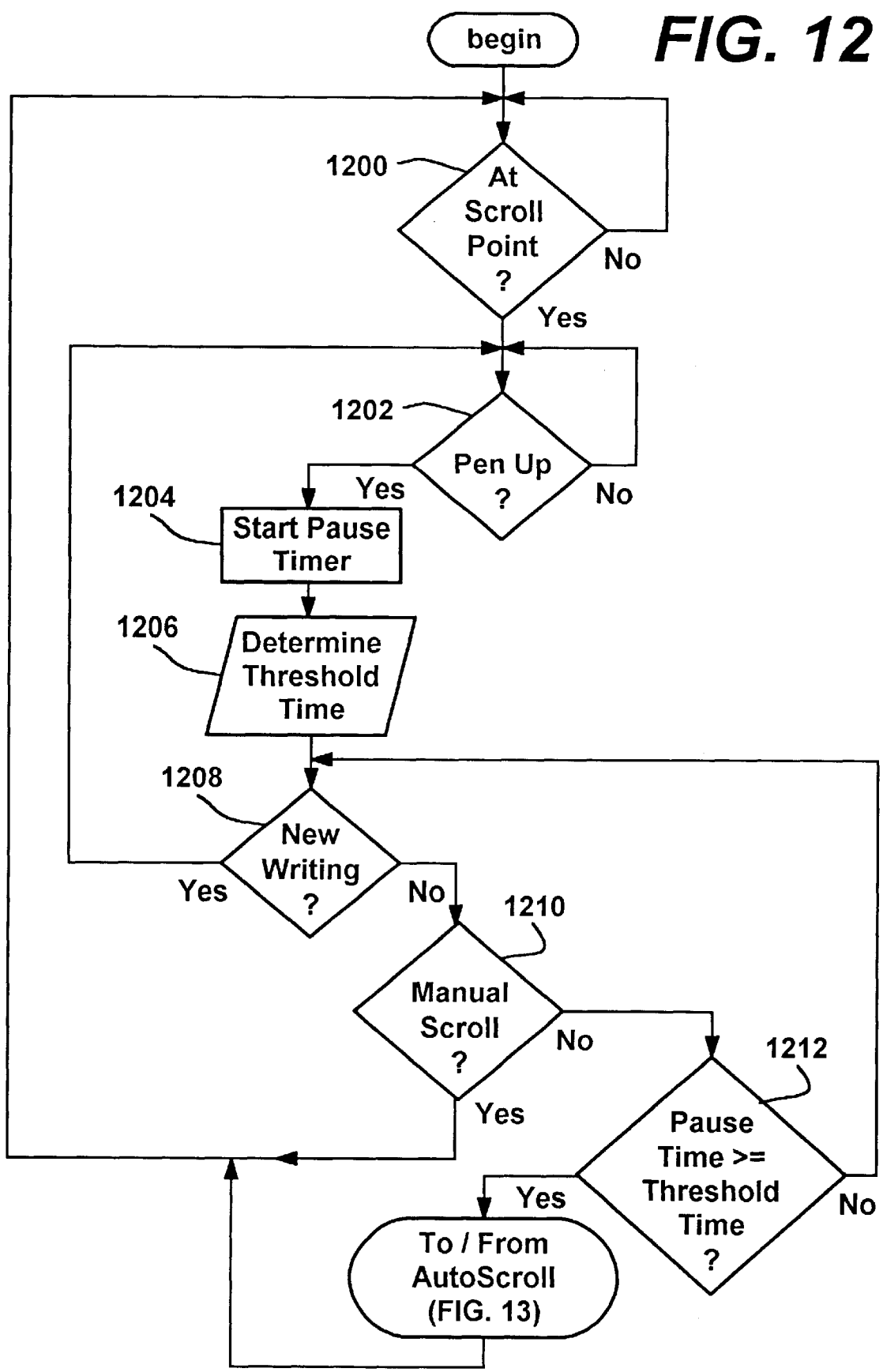
FIG. 12 is a flow diagram generally representing steps taken to determine when to automatically scroll in accordance with an aspect of the present invention.
Figure 13:
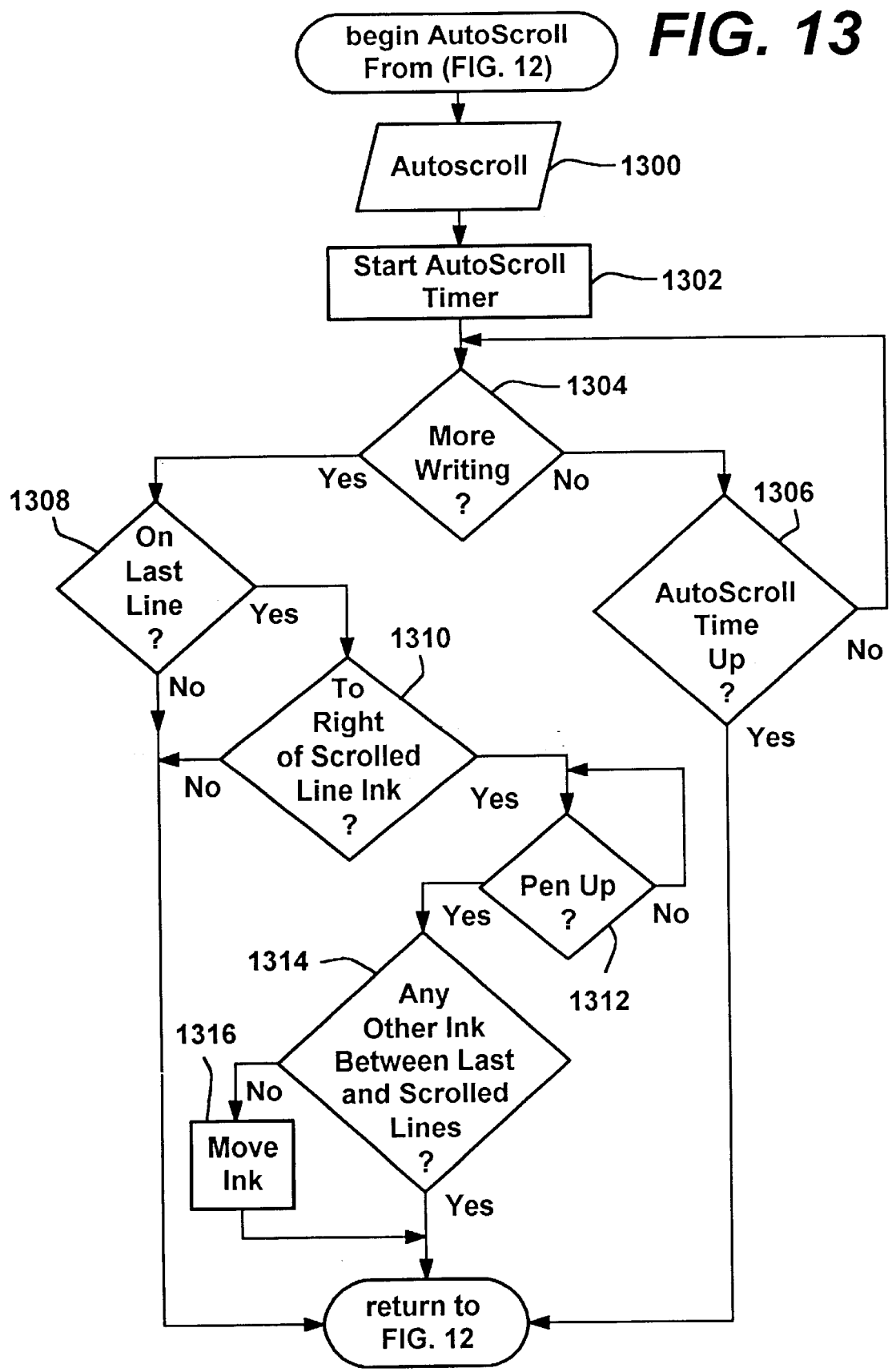
FIG. 13 is a flow diagram representing steps taken to determine when to move new ink up to scrolled ink in accordance with another aspect of the present invention.

Turning to an explanation of the operation of the present invention, FIGS. 3–11 represent ink being written, while FIGS. 12 and 13 are flow diagrams describing the general steps taken by the autoscroll mechanism 72 to handle the automatic scrolling operation. For purposes of the following description, the last line will be used as the scroll point, and a pen-up event will be the start of a pause. In FIG. 3, a user has written ink 64, but has not yet reached the scroll point. Accordingly, the targeting component 74 generally takes no action at this time other than to query the ink parser mechanism 70 for the current line status, such as via regular function calls thereto. Note that alternatively, the ink parser mechanism 70 may provide line status change notifications to the targeting component, or write the line status into a shared memory location.

Figure 4:
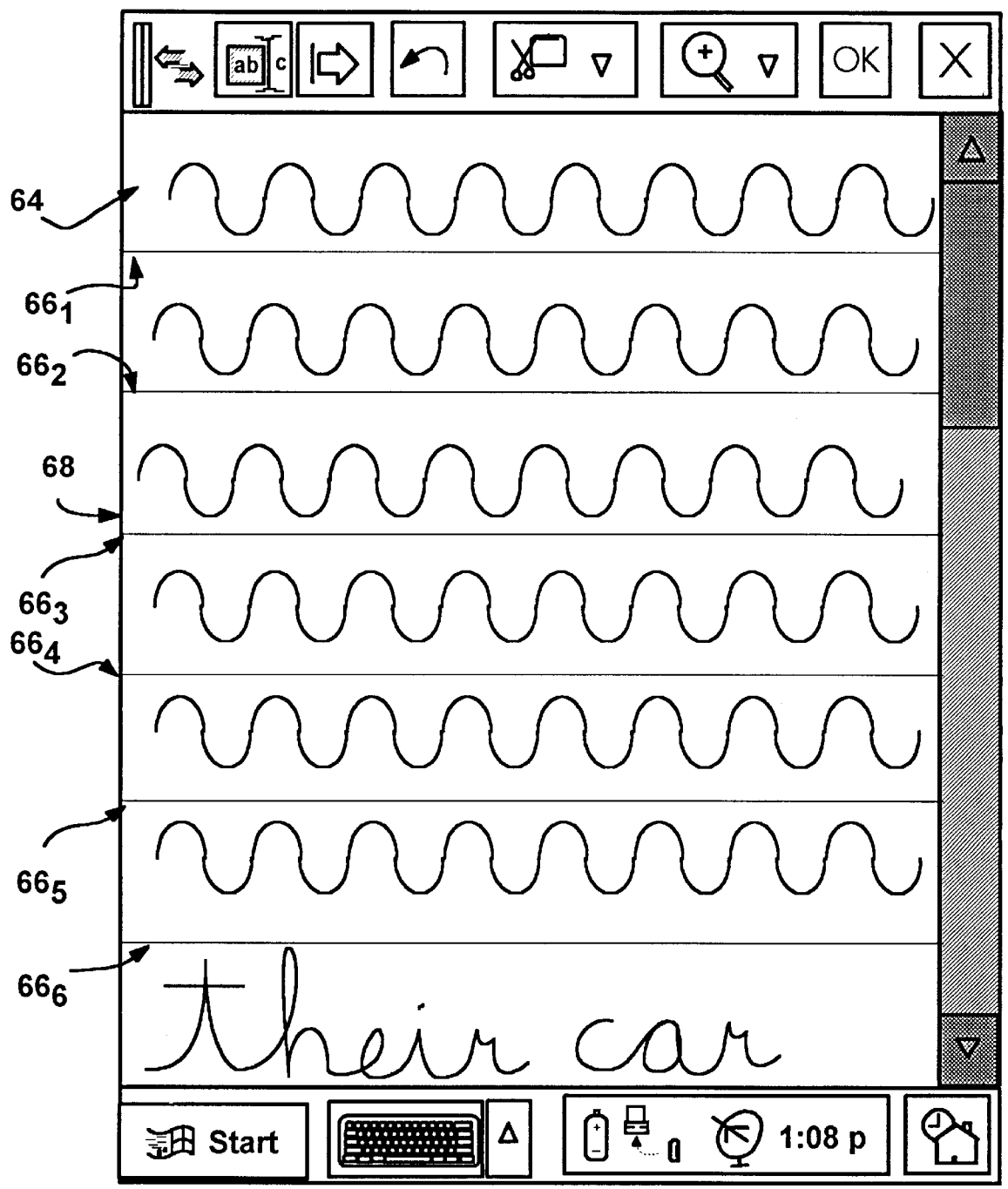
FIGS. 4–5 represent a display on a touch-sensitive display screen on an exemplary computing device showing the written ink having reached a scroll point, and having been automatically scrolled, respectively, in accordance with an aspect of the present invention.

In FIG. 4, the user has reached the last line, whereby the targeting component 74 now waits for a user pen-up event, as represented in the flow diagram of FIG. 12 by steps 1200 and 1202. Although not separately shown, it is readily apparent in FIG. 4 that a pen up event occurs when the user has completed the input of the first word on the last line, ("their"), possibly to cross the "t" and dot the "i" therein, before beginning to write the next word. When the pen-up occurs, step 1202 branches to step 1204 where the timer 76 is reset and started, e.g., a time stamp is recorded for the pen-up event. Next, at step 1206, a threshold time is determined.

In accordance with another aspect of the present invention, the threshold time may be fixed, or may be variable based on criteria. For example, the threshold time may be based on the writing speed of the user. To this end, the autoscroll mechanism 72 can calculate the amount of time it took for the user to write some number of lines, optionally averaging it over the entire document or even averaging it with past information for the user that is persistently maintained. In general, the faster the writing speed, the shorter the threshold time, and vice-versa. In this manner, the threshold time may adapt to the user, providing perceived intelligence to the automatic scrolling operation.

Moreover, as described below, the x-coordinate where the pen-up occurred may be used to determine the threshold time, since it is more likely that the user desires scrolling if there is little or no room left on the last line for additional ink. Also, the ink itself may be examined, i.e., it is more likely that scrolling is desired if the user has paused after having written a period or other punctuation symbol. Some or all of these criteria may be combined, e.g., the writing speed multiplied by the x-coordinate produces a factor that increases or decreases some base time value.

In any event, once a threshold time is obtained, step 1208 tests whether the user has resumed writing, as ascertained by a pen-down event. If so, (e.g., the user has begun to write the word "car" in FIG. 4), step 1208 returns the process to step 1202 to await the next pen-up event. Note that before the next pause, the user may have written to a location that will change the threshold time to be determined at step 1206, for example by having written to a higher x-coordinate.

If at step 1208 the user has not resumed writing, step 1208 branches to step 1210 where it is determined whether the user manually scrolled, such as via the button 80 or slider bar 82 (FIG. 3). If so, the ink has moved up, and the process returns to step 1200 to again await the user reaching the last line. If the user has neither written (step 1208) nor manually scrolled (step 1210), step 1212 is executed which tests whether the length of time that the user has paused has exceeded the threshold time that was determined at step 1206. This may be calculated by subtracting the pen-up time stamp from the current system time. Note that if the threshold time is fixed, step 1206 need not exist and step 1212 may instead use a constant for the threshold time. If the time for automatic scrolling is not yet achieved, step 1212 loops back to step 1208 to repeat the tests for new writing, manual scrolling or the time being achieved.

Figure 5:
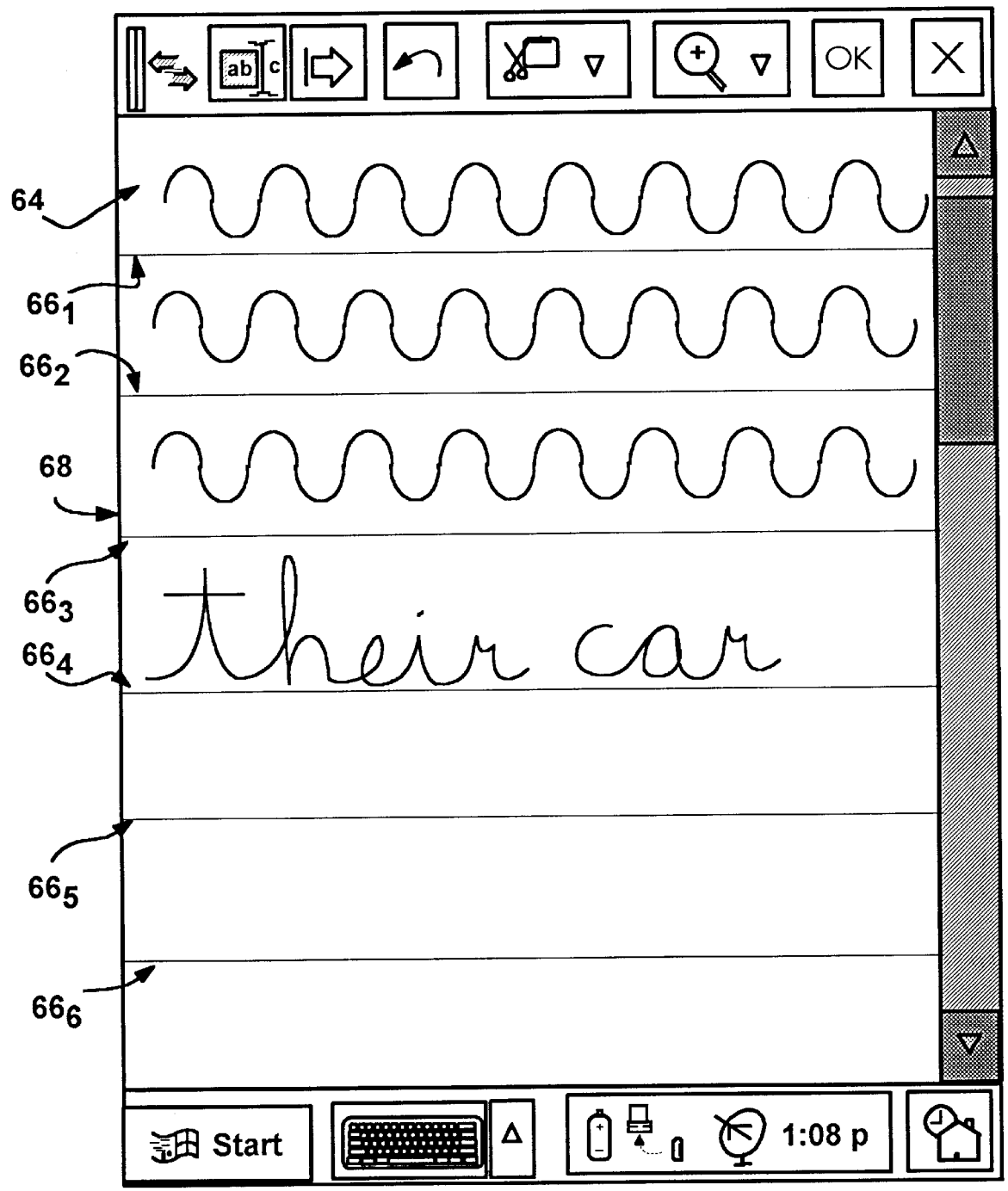
Figure 6:
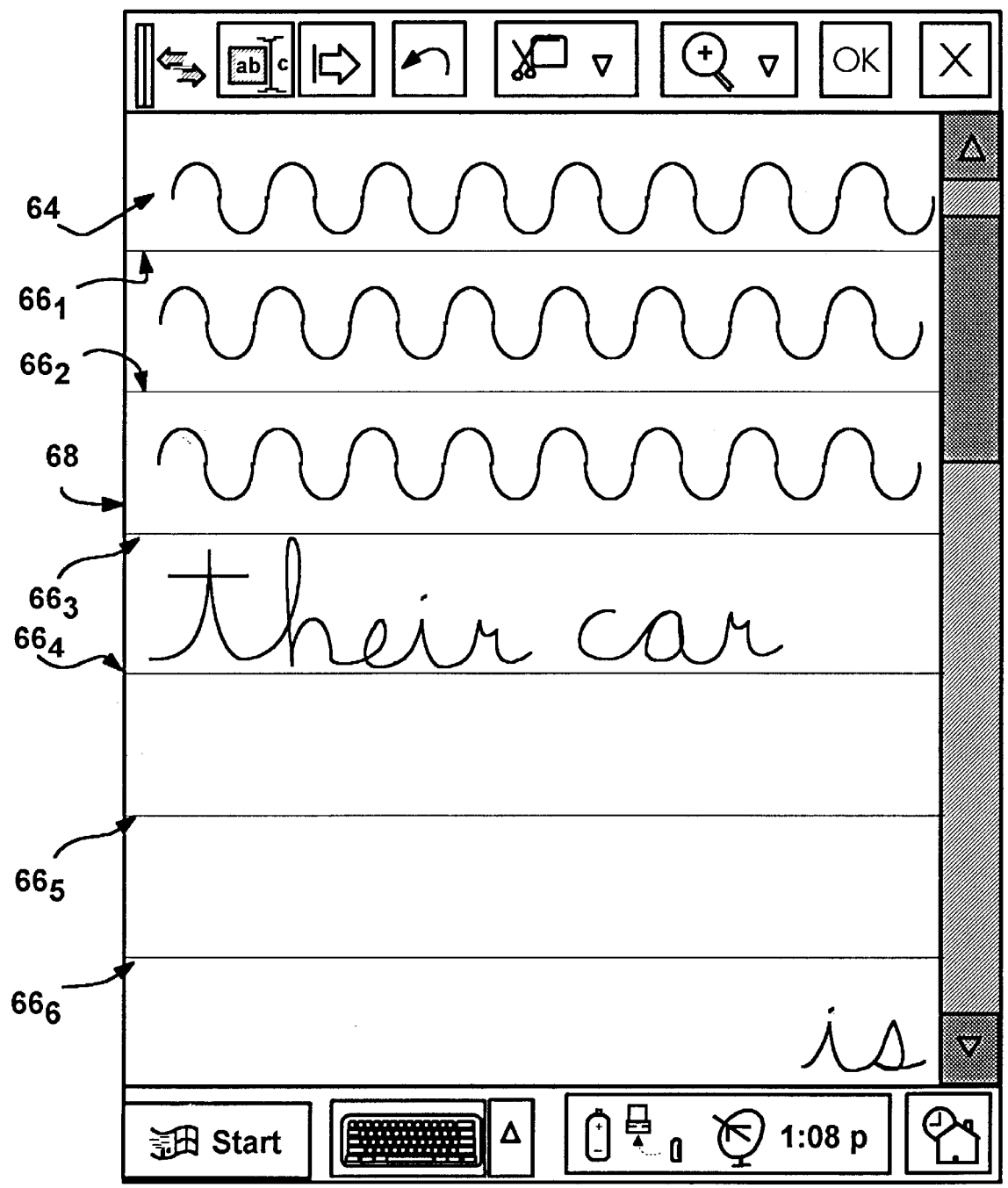
FIGS. 6–7 represent a display on a touch-sensitive display screen on an exemplary computing device showing new ink having been written after the scrolling operation represented in FIG. 5, and the new ink moved up to the scrolled ink, respectively, in accordance with an aspect of the present invention.

In FIG. 5, consider the threshold time having been achieved at step 1212 once the user has written the word "car" in FIG. 4 and paused thereafter. When this occurs, step 1212 branches to step 1300 of FIG. 13, wherein the targeting component 74 calls the scrolling component 78 to scroll the ink. The result of the automatic scrolling operation is represented in FIG. 5, where the ink has moved up three lines, and three new lines are available for input. However, it is possible that the user did not want to scroll yet, as shown in FIG. 6, wherein the user has written new ink ("is") expecting it to follow the previous ink ("car"). The autoscroll mechanism 72 may include a process to correct this situation so that the user is not left with an undesired vertical gap between words. Such a process is shown in FIG. 13, and is based on an set of rules that intelligently determines when it is likely that such a gap was not intended by the user.

At step 1302, a separate autoscroll timer is started, (e.g., a timestamp of the current time is obtained and stored), to help determine the user's intent. In general, if a user does not write new ink by some further time, such as within three seconds of the scrolling operation, any new ink is left as is, (since it is not highly likely that a user expecting to continue writing will both pause very long and also not notice the scrolling). To this end, step 1304 tests for new ink, (a pen-down event), and if no new ink has been or is being written, branches to step 1306 to test the elapsed time, e.g., the current time minus the autoscroll time stored at step 1302. If the time has not elapsed, step 1306 returns to step 1304, looping back until either the user writes new ink or the loop times out. If the loop times out, the process returns to FIG. 12 as described above, where any new ink is accepted as is in its current position relative to the scrolled ink position.

If instead the user has resumed writing at step 1304, it is possible that the user intends that this next writing directly follow the ink that was just automatically scrolled up. If such an event is true, the new ink would be being written on the current last line, since the preceding ink was formerly on the last line. Step 1308 tests for this condition by obtaining the current line status from the ink parser mechanism 70, whereby if the user is writing anywhere but the last line, the process returns to FIG. 12 where the new ink will be left as is. Similarly, if the new ink was intended to be directly after the just-scrolled ink, it would be to the right thereof. Step 1310 tests for this condition by analyzing the x-coordinates of the scrolled ink and the pendown position, whereby if not to the right of the scrolled ink, the process returns to FIG. 12 and the new ink remains as is.

Figure 7:
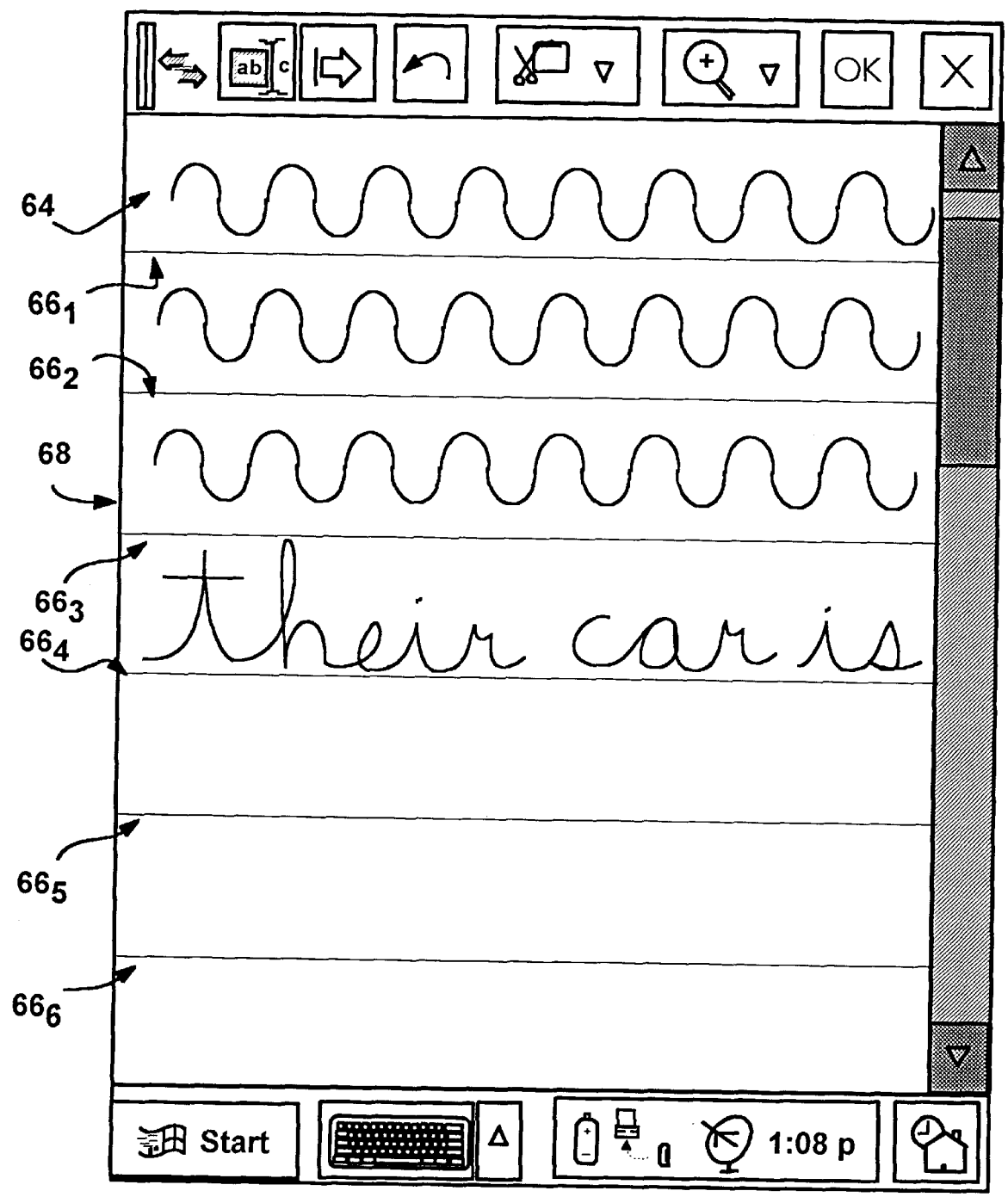

Steps 1312–1314 await a pen-up event and test for the presence of any new ink between the last and scrolled lines when the user has completed the writing of this next set of ink. For example, it is possible that the user has intended to draw a sketch by placing the pen in the lower right corner and moving it generally upward. Such activity would satisfy the previous tests of steps 1304, 1308 and 1310, but would not be intended to follow the previously scrolled ink. Note that it is also possible at this time to query the ink parser mechanism 70 to determine if the user has written what appears to be a word, and if not, the new ink may be left alone. Also, it is possible that the user was quick enough to start writing on the new blank lines before returning to the lower right corner. If so, this new ink should be left in its current position relative to the scrolled ink. However, if the user has not written anywhere but the last line, the new ink is moved when the user finishes writing it, as represented by steps 1314 and 1316. This is shown via the word "is" in FIG. 6 being moved up as shown in FIG. 7.

In sum, the autoscroll mechanism 72 provides a four-part test before moving the ink for the user, a test of the time before the next writing, a test for the last line, a test for the horizontal position exceeding the previous ink's horizontal position, and a test for other ink written to the newly available lines. As can be readily appreciated, the tests determine the user's likely intent with respect to newly input ink, and thus further increase the perceived intelligence of the automatic scrolling operation of the present invention.

Figure 8:
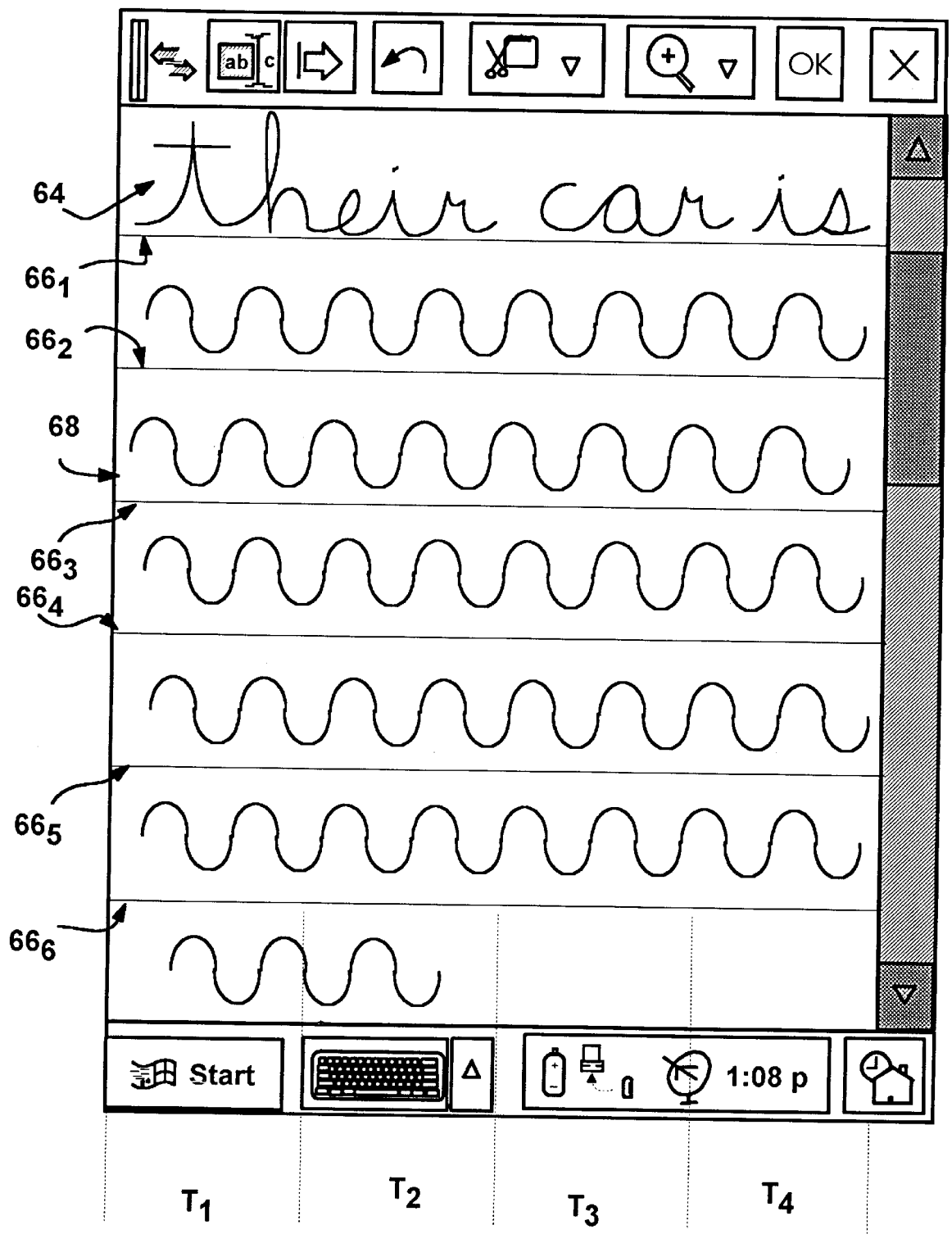
FIG. 8 represents a display on a touch-sensitive display screen on an exemplary computing device showing the use of the horizontal position of the ink to determine an automatic scrolling time in accordance with another aspect of the present invention.

FIG. 8 represents the determination of a threshold time (step 1206) based on the x-coordinate of the writing when the user lifts the pen. In FIG. 8, the last line is logically divided into four quadrants, represented by the dashed lines (not seen by the user). Each quadrant has a threshold time associated therewith, shown as $T_1$–$T_4$. For example, time $T_1$ may be one-and-one half seconds, time $T_2$ one-and-one quarter seconds, time $T_3$ one second and time $T_4$ three-quarters of a second. In the implementation represented in FIG. 8, the threshold time is the value associated with the quadrant in which the user lifted the pen.

Figure 9:
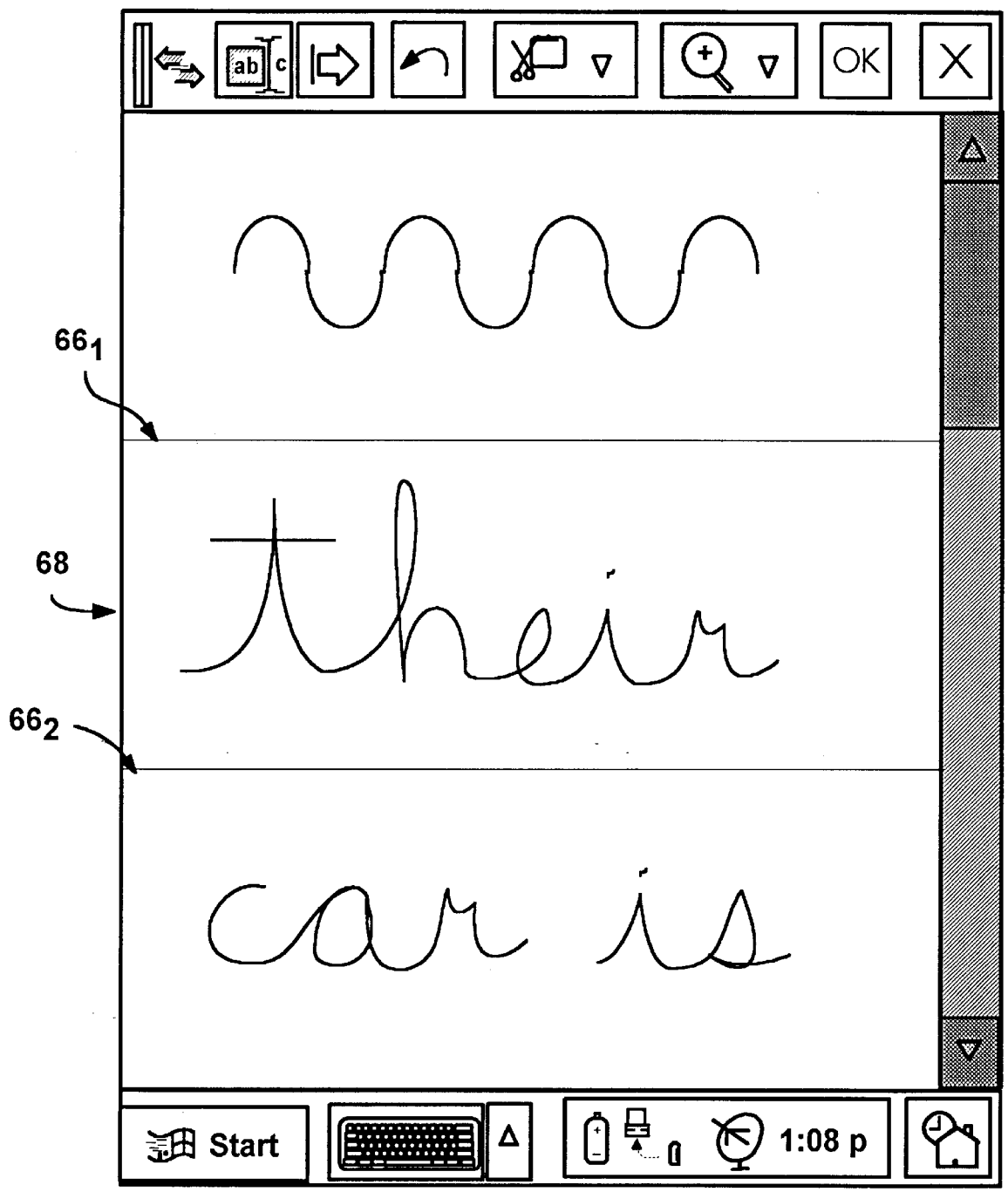
FIG. 9 represents a display on a touch-sensitive display screen on an exemplary computing device showing the receipt of written ink input while in a zoomed-in state relative to the zoom percentage of FIGS. 3–8.

FIG. 9 shows ink written to a screen having a different zoom percentage such that only three lines are available for writing. FIG. 10 shows how the x-coordinate-based threshold time may be further varied based on the zoom percentage, for example, instead of quadrants there are only two zones, with threshold times $T_1$ and $T_2$. Lastly, FIG. 11 shows how the amount of automatic scrolling may be changed based on the zoom percentage, for example two lines instead of three since scrolling more than two lines would leave a blank screen and would thus be generally undesirable. In general, each of these features further increases the intelligence perceived by the user with respect to the automatic scrolling operation.

Lastly, while the present invention provides many benefits for hand-held and palm-sized computing devices and thus has primarily been described above with respect thereto, it should be understood that the present invention may be implemented in virtually any computing environment capable of receiving user pen input. Indeed, the present invention has been implemented on a desktop personal computer with a tablet device connected thereto.

As can be seen from the foregoing detailed description, there is provided a method for automatically scrolling handwritten user input. The method is flexible, intelligent and may adapt to the user.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system having a program for receiving ink written by a user, a method of automatically scrolling the ink, comprising the steps of, determining when the ink has achieved a scroll point, detecting a pause in user writing, comparing a duration of the pause against a threshold time, and if the threshold time is achieved, scrolling the ink.

2. The method of claim 1 wherein the step of determining when the ink has achieved the scroll point includes the step of determining when the user is writing on a last line.

3. The method of claim 1 wherein the step of determining when the ink has achieved the scroll point includes the step of querying a mechanism for parsing the ink.

4. The method of claim 1 wherein the step of detecting the pause in user writing comprises the step of receiving a pen up event.

5. The method of claim 1 wherein the step of comparing a duration of the pause against a threshold time includes the step of starting a timer in response to detecting the pause.

6. The method of claim 5 wherein the step of starting the timer comprises the step of storing a time stamp.

7. The method of claim 1 further comprising the step of determining the threshold time based on one or more criteria.

8. The method of claim 7 wherein the threshold time is determined on one or more criteria including an x-coordinate of the ink.

9. The method of claim 8 wherein the threshold time is determined as a first value if the pause corresponds to an x-coordinate below a predetermined number, and determined as a second value if the pause corresponds to an x-coordinate above the predetermined number.

10. The method of claim 8 wherein the threshold time is inversely related to the x-coordinate that corresponds to the pause.

11. The method of claim 8 wherein the threshold time is one of four values selected based on the x-coordinate that corresponds to the pause.

12. The method of claim 7 wherein the threshold time is determined on one or more criteria including a zoom percentage.

13. The method of claim 7 wherein the threshold time is determined on one or more criteria including a writing speed of the user.

14. The method of claim 7 wherein the threshold time is determined on one or more criteria including an x-coordinate of the ink and a zoom percentage.

15. The method of claim 7 wherein the threshold time is determined on one or more criteria including an x-coordinate of the ink and a writing speed of the user.

16. The method of claim 7 wherein the threshold time is determined on one or more criteria, including an x-coordinate of the ink, a zoom percentage, and a writing speed of the user.

17. The method of claim 7 wherein the threshold time is determined on one or more criteria including at least one character written by the user.

18. The method of claim 1 wherein the step of scrolling the ink comprises the steps of, determining an amount to scroll based on a zoom percentage, and scrolling that amount.

19. The method of claim 1 wherein the step of scrolling the ink moves at least some existing ink to a new position, and further comprising the step of detecting new ink after the step of scrolling.

20. The method of claim 19 further comprising the step of moving the new ink relative to the new position of the existing ink.

21. The method of claim 19 further comprising the steps of, determining a time difference based on a time of the scrolling and a time that the new ink was detected, comparing the time difference against a predetermined time, and if the time difference did not achieve the predetermined time, leaving the new ink in a current position thereof relative to the new position of the existing ink.

22. The method of claim 21 wherein the time difference achieved the predetermined time, and further comprising the step of moving the new ink relative to the new position of the existing ink.

23. The method of claim 19 further comprising the steps of, determining whether the new ink was written on a last line, and if the new ink was not written on the last line, leaving the new ink in a current position thereof relative to the new position of the existing ink.

24. The method of claim 23, wherein the new ink was written on the last line, and further comprising the step of moving the new ink relative to the new position of the existing ink.

25. The method of claim 19 further comprising the steps of, determining whether the new ink was written to the right of ink on a last scrolled line, and if the new ink was not written to the right thereof, leaving the new ink in a current position thereof relative to the new position of the existing ink.

26. The method of claim 25, wherein the new ink was written to the right of the ink on the last scrolled line, and further comprising the step of moving the new ink relative to the new position of the existing ink.

27. The method of claim 19 further comprising the steps of, determining whether the new ink was written between a last scrolled line and a last line, and if the new ink was written therebetween, leaving the new ink in a current position thereof relative to the new position of the existing ink.

28. The method of claim 27, wherein the new ink was not written between a last scrolled line and a last line, and further comprising the step of moving the new ink relative to the new position of the existing ink.

29. The method of claim 19 further comprising the steps of, determining a time difference based on a time of the scrolling and a time that the new ink was detected, determining whether the new ink was written on a last line, and if either the time difference did not achieve a predetermined time or if the new ink was not written on the last line, leaving the new ink in a current position thereof relative to the new position of the existing ink.

30. The method of claim 19 further comprising the steps of, determining a time difference based on a time of the scrolling and a time that the new ink was detected, determining whether the new ink was written on a last line, determining whether the new ink was written to the right of ink on a last scrolled line, and if either (a) the time difference did not achieve the predetermined time, (b) the new ink was not written on the last line, or (c) the new ink was not written to the right ink of the ink on the last scrolled line, leaving the new ink in a current position thereof relative to the new position of the existing ink.

31. The method of claim 19 further comprising the steps of, determining a time difference based on a time of the scrolling and a time that the new ink was detected, determining whether the new ink was written on a last line, determining whether the new ink was written to the right of ink on a last scrolled line, determining whether the new ink was written between the last scrolled line and the last line, and if either (a) the time difference did not achieve the predetermined time, (b) the new ink was not written on the last line, (c) the new ink was not written to the right ink of the ink on the last scrolled line, or (d) the new ink was written between the last scrolled line and the last line, leaving the new ink in a current position thereof relative to the new position of the existing ink.

32. The method of claim 31 further comprising the step of moving the new ink relative to the new position of the existing ink.

33. A computer readable medium having computer-executable instructions for performing steps comprising:

(a) receiving ink written by a user;

(b) determining that the ink has achieved a scroll point;

(c) detecting a pause in user writing;

(d) comparing a duration of the pause against a threshold time; and (e) if the threshold time is achieved, scrolling the ink.

34. The computer readable medium of claim 33 wherein the step of detecting the pause in user writing comprises the step of detecting a pen up event.

35. The computer readable medium of claim 33 wherein the threshold time is determined based on an x-coordinate of the ink.

36. The computer readable medium of claim 33 wherein the threshold time is determined based on a writing speed of the user.

37. The computer readable medium of claim 33 wherein the threshold time is based on a zoom percentage.

38. The computer readable medium of claim 33 wherein the threshold time is based on at least one character written by the user.

39. The computer readable medium of claim 33 wherein the step of scrolling the ink moves at least some existing ink to a new position, and having further computer-executable instructions for performing the steps of:

(1) detecting new ink after the step of scrolling;

(2) determining a time difference based on a time of the scrolling and a time that the new ink was detected;

(3) determining whether the new ink was written on a last line;

(4) determining whether the new ink was written to the right of ink on a last scrolled line;

(5) determining whether the new ink was written between the last scrolled line and the last line; and (6) leaving the new ink in a current position thereof relative to the new position of the existing ink if either:

(a) the time difference did not achieve the predetermined time;

(b) the new ink was not written on the last line;
(c) the new ink was not written to the right ink of the ink on the last scrolled line; or
(d) the new ink was written between the last scrolled line and the last line.

40. The computer readable medium of claim 39 having further computer-executable instructions for performing the step of moving the new ink relative to the new position of the existing ink.

41. The computer readable medium of claim 33 wherein the step of receiving ink written by a user includes the step of receiving information from a touch-sensitive input device.

42. The computer readable medium of claim 33 wherein the step of receiving ink written by a user includes the step of receiving information from a tablet input device.

* * * * *

UNITED STATES PATENT AND TRADEMARK OFFICE
CERTIFICATE OF CORRECTION

PATENT NO.    : 6,256,009 B1
DATED         : July 3, 2001
INVENTOR(S)   : Lui et al.

It is certified that error appears in the above-identified patent and that said Letters Patent is hereby corrected as shown below:

Column 3,
Line 53, "RS-232" should read -- RS-232 --.

Column 6,
Line 47, "an set" should read -- a set --.

Column 10,
Lines 7 and 19-20, "right ink of the ink" should read -- right of the ink --

Column 11,
Lines 2-3, "right ink of the ink" should read -- right of the ink --.

Signed and Sealed this

Ninth Day of November, 2004

JON W. DUDAS
*Director of the United States Patent and Trademark Office*